(12) United States Patent
Forlenza et al.

(10) Patent No.: US 7,917,771 B2
(45) Date of Patent: *Mar. 29, 2011

(54) METHOD FOR SELECTIVE ENCRYPTION WITHIN DOCUMENTS

(75) Inventors: Randolph Michael Forlenza, Austin, TX (US); Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/135,321

(22) Filed: Jun. 9, 2008

(65) Prior Publication Data

US 2008/0270807 A1 Oct. 30, 2008

Related U.S. Application Data

(63) Continuation of application No. 10/824,806, filed on Apr. 15, 2004, now Pat. No. 7,484,107.

(51) Int. Cl.
*H04L 9/14* (2006.01)
*H04L 9/32* (2006.01)

(52) U.S. Cl. ............ 713/193; 713/166; 380/44; 380/45; 380/260

(58) Field of Classification Search .................. 713/193, 713/166
See application file for complete search history.

(56) References Cited

U.S. PATENT DOCUMENTS

| | | | |
|---|---|---|---|
| 4,782,529 A | 11/1988 | Shima | |
| 5,157,763 A | 10/1992 | Peters et al. | |
| 5,212,784 A | 5/1993 | Sparks | |
| 5,267,313 A | 11/1993 | Hirata | |
| 5,541,997 A | 7/1996 | Pappas et al. | |
| 5,673,316 A | 9/1997 | Auerbach et al. | |
| 5,933,498 A | 8/1999 | Schneck et al. | |
| 6,023,506 A | 2/2000 | Ote et al. | |

(Continued)

FOREIGN PATENT DOCUMENTS

WO WO0201271 A1 1/2002

OTHER PUBLICATIONS

U.S. Appl. No. 12/001,475, filed Dec. 11, 2007, First Named Inventor Randolph Michael Forlenza; Confirmation No. 3221.

(Continued)

*Primary Examiner* — Matthew T Henning
(74) *Attorney, Agent, or Firm* — Schmeiser, Olsen & Watts; William H. Steinberg

(57) ABSTRACT

The present invention allows the user (author or creator) of a document to specify that certain portions of a document be selected for encryption while other portions of the document remain displayed as created. In addition, each encrypted section could have multiple encryption keys such that some viewers can review certain parts of the document while other viewers will not have that same access. The user could employ a standard word processing editor technique to highlight (or swipe) portions of a document that the user desires to be encrypted. The highlighted portion would then be 'tagged' with a surrounding attribute indicating to the word processor that this highlighted portion of the document is to be encrypted. The highlighted sections would also have encryption keys associated with the highlighted and encrypted section. Any one of the encryption keys for that section would decrypt that section. With proper authorization, any encrypted portion of a document would be displayed as part of the document. Without proper authorization, the display of the document would only contain the unencrypted portions of the document.

17 Claims, 8 Drawing Sheets

U.S. PATENT DOCUMENTS

| | | | |
|---|---|---|---|
| 6,339,825 B2 | 1/2002 | Pensak et al. | |
| 6,345,256 B1 | 2/2002 | Milsted et al. | |
| 6,449,721 B1 | 9/2002 | Pensak et al. | |
| 6,598,161 B1 | 7/2003 | Kluttz et al. | |
| 6,631,482 B1 | 10/2003 | Marks | |
| 6,651,171 B1* | 11/2003 | England et al. | 713/193 |
| 6,868,495 B1 | 3/2005 | Glover | |
| 6,920,567 B1 | 7/2005 | Doherty et al. | |
| 6,941,459 B1 | 9/2005 | Hind et al. | |
| 6,954,532 B1 | 10/2005 | Handley et al. | |
| 7,003,664 B2 | 2/2006 | Kori | |
| 7,103,915 B2 | 9/2006 | Redlich et al. | |
| 7,178,033 B1 | 2/2007 | Garcia | |
| 7,322,047 B2 | 1/2008 | Redlich et al. | |
| 7,346,769 B2 | 3/2008 | Forlenza et al. | |
| 7,484,107 B2* | 1/2009 | Forlenza et al. | 713/193 |
| 7,600,183 B2 | 10/2009 | Stern et al. | |
| 2002/0051545 A1 | 5/2002 | Ogilvie | |
| 2002/0083325 A1 | 6/2002 | Mediratta et al. | |
| 2002/0159594 A1 | 10/2002 | Kori | |
| 2003/0021412 A1 | 1/2003 | Candelore et al. | |
| 2003/0110131 A1 | 6/2003 | Alain et al. | |
| 2003/0179412 A1* | 9/2003 | Matsunoshita | 358/3.28 |
| 2004/0025019 A1 | 2/2004 | Watanabe et al. | |
| 2004/0123126 A1 | 6/2004 | Lee | |
| 2005/0071657 A1 | 3/2005 | Ryan | |

OTHER PUBLICATIONS

Office Action (Mail Date Oct. 7, 2009) for U.S. Appl. No. 12/001,475, filed Dec. 11, 2007, First Named Inventor Randolph Michael Forlenza et al.; Confirmation No. 3221.

Office Action (Mail Date Feb. 19, 2010) for U.S. Appl. No. 12/001,475, filed Dec. 11, 2007; Confirmation No. 3221.

Office Action (Mail Date Mar. 17, 2008) for U.S. Appl. No. 10/835,502, filed Apr. 29, 2004; Confirmation No. 7993.

Office Action (Mail Date Aug. 29, 2008) for U.S. Appl. No. 10/835,502, filed Apr. 29, 2004; Confirmation No. 7993.

Office Action (Mail Date Sep. 21, 2009) for U.S. Appl. No. 10/835,502, filed Apr. 29, 2004; Confirmation No. 7993.

Office Action (Mail Date Mar. 12, 2010) for U.S. Appl. No. 10/835,502, filed Apr. 29, 2004; Confirmation No. 7993.

Office Action (Mail Date Jun. 2, 2010) for U.S. Appl. No. 12/001,475, filed Dec. 11, 2007; Confirmation No. 3221.

Office Action (Mail Date Jan. 30, 2007) for U.S. Appl. No. 10/692,142, filed Oct. 23, 2003; Confirmation No. 9190.

Jul. 10, 2007 Response to Office Action (Mail Date Jan. 30, 2007) for U.S. Appl. No. 10/692,142, filed Oct. 23, 2003; Confirmation No. 9190.

Notice of Allowance (Mail Date Oct. 31, 2007) for U.S. Appl. No. 10/692,142, filed Oct. 23, 2003; Confirmation No. 9190.

Office Action (Mail Date Apr. 29, 2008) for U.S. Appl. No. 10/824,806, filed Apr. 15, 2004; Confirmation No. 6685.

Jun. 10, 2008 Response to Office Action (Mail Date Apr. 29, 2008) for U.S. Appl. No. 10/824,806, filed Apr. 15, 2004; Confirmation No. 6685.

Notice of Allowance (Mail Date Sep. 17, 2008) for U.S. Appl. No. 10/824,806, filed Apr. 15, 2004; Confirmation No. 6685.

Jan. 4, 2010 Response to Office Action (Mail Date Oct. 7, 2009) for U.S. Appl. No. 12/001,475, filed Dec. 11, 2007, First Named Inventor Randolph Michael Forlenza et al.; Confirmation No. 3221.

May 18, 2010 Response to Office Action (Mail Date Feb. 19, 2010) for U.S. Appl. No. 12/001,475, filed Dec. 11, 2007; Confirmation No. 3221.

Jul. 17, 2008 Response to Office Action (Mail Date Mar. 17, 2008) for U.S. Appl. No. 10/835,502, filed Apr. 29, 2004; Confirmation No. 7993.

Dec. 1, 2008 Response to Office Action (Mail Date Aug. 29, 2008) for U.S. Appl. No. 10/835,502, filed Apr. 29, 2004; Confirmation No. 7993.

Dec. 21, 2009 Response to Office Action (Mail Date Sep. 21, 2009) for U.S. Appl. No. 10/835,502, filed Apr. 29, 2004; Confirmation No. 7993.

Mar. 30, 2010 Response to Office Action (Mail Date Mar. 12, 2010) for U.S. Appl. No. 10/835,502, filed Apr. 29, 2004; Confirmation No. 7993.

Jul. 12, 2010 Filed RCE with Preliminary Amendment for U.S. Appl. No. 10/835,502, filed Apr. 29, 2004; Confirmation No. 7993.

Notice of Allowance (Mail Date Sep. 2, 2010) for U.S. Appl. No. 10/835,502, filed Apr. 29, 2004; Confirmation No. 7993.

Sep. 2, 2010 RCE with Preliminary Amendment filed in response to Office Action (Mail Date Jun. 2, 2010) for U.S. Appl. No. 12/001,475, filed Dec. 11, 2007; Confirmation No. 3221.

* cited by examiner

FIG. 5A
FIG. 5b
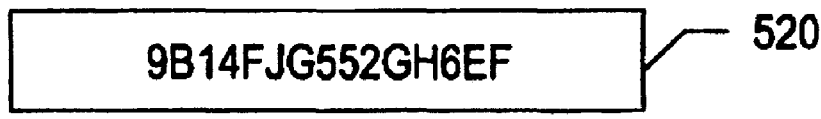
FIG. 5c
FIG. 6

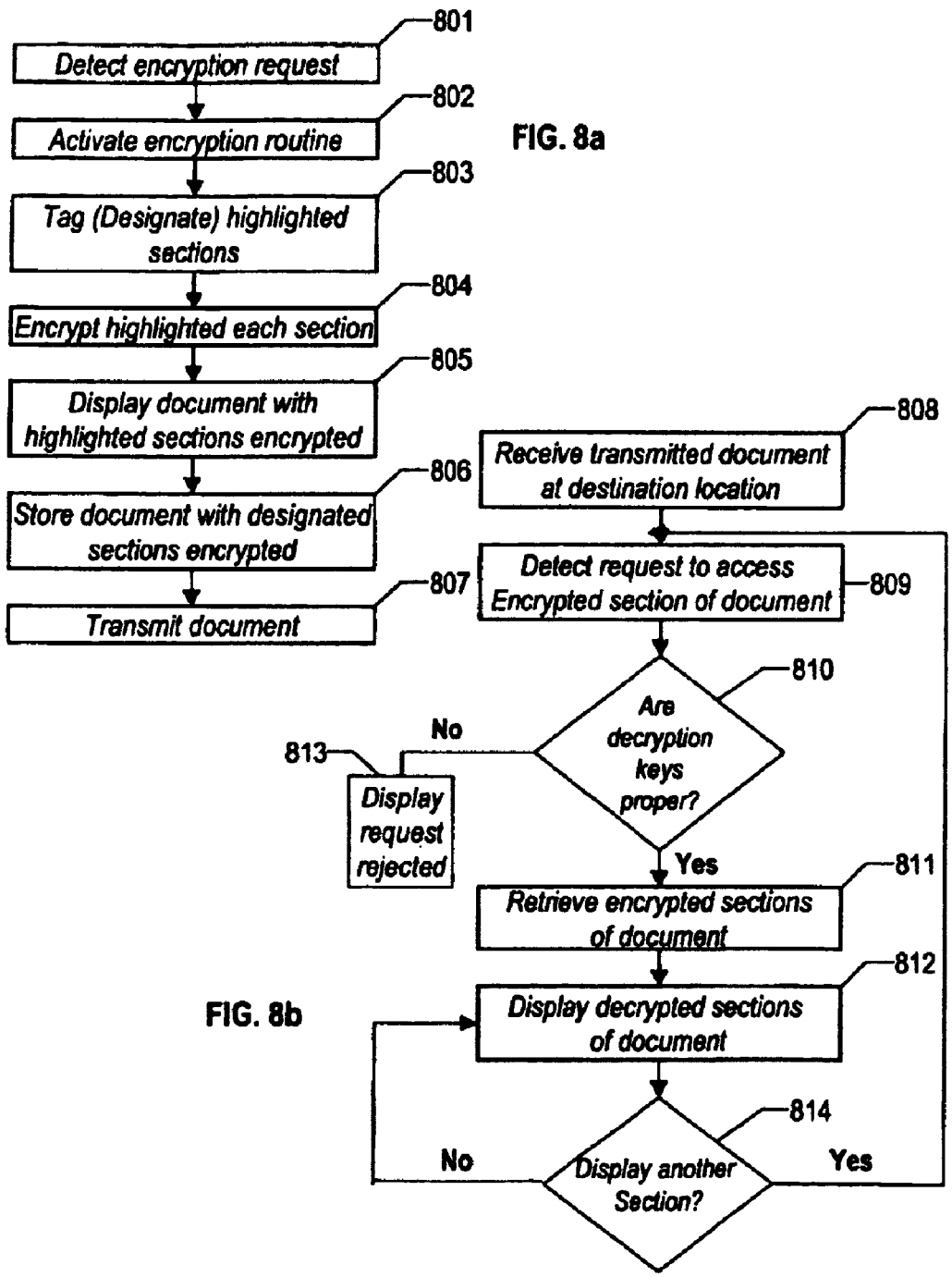

METHOD FOR SELECTIVE ENCRYPTION WITHIN DOCUMENTS

CROSS-REFERENCE TO RELATED APPLICATIONS

This application is a continuation of the application Ser No. 10/824,806 filed on Apr. 15, 2004, now U.S. Pat No. 7,484,107.

FIELD OF THE INVENTION

The present invention provides a method and system for protecting and securing electronic documents and in particular to a method and system for selectively encrypting sections of a document with multiple encryption keys.

BACKGROUND OF THE INVENTION

Present day computer systems enable a user to create various types of documents. These documents can contain text, graphics, images or a combination of each. Many times the creator of a document for various reasons desires to keep secret the contents of a document. Often times the secrecy is for security reasons. In many businesses, various types of documents that exist on computer systems contain confidential information that can be related to the company's trade secrets and business strategies. Most technology related companies maintain much of their research and product development information on computer systems that are protected by elaborate security systems. Governmental agencies also maintain much of their documented information on a confidential basis. Even individuals keep important records and other information in confidential files.

Often, it is necessary to share documentation that contains confidential information with persons. Presently, there are various ways to secure the documents and prevent unauthorized persons from viewing the contents of a document. One way to protect documents is zip the document in a secured file that can be password protected. In this approach, when someone desires to access the document, that person must first submit the proper password. If the password is correct, the document is retrieved and displayed for the requesting viewer. During transmission of a document over a computing network such as the Internet, the document can be attached to an electronic message and transmitted with the message. The receiver of the message can download the attachment and with the proper password, retrieve the attached and secured document.

In other situations, a person must show that they have authority to access a computing network from which one can access certain confidential information. These systems typically exist in financial settings such as accessing bank or credit accounts.

A third technique used today to secure the contents of a document is to encrypt the document contents. In this approach, the document would be encrypted and stored by the document creator. To access the document, one would need to have the proper decryption key(s). In many cases, the documents would be transmitted over a computing network to a destination location. The encryption would serve to secure the document during the transmission of the document over the network. Again, at the destination location, decryption would occur using the appropriate decryption keys.

One disadvantage is that the current document security systems are all or nothing propositions. With reference to document encryption, today, the only known means of encrypting certain elements of a document is to encrypt the entire document. In some instances encryption currently may be accomplished only during a transmission (HTTPS). Regardless, the entire document is encrypted. The drawback to this approach is that encryption imposes a serious performance impact and usability impact. HTTPS transmissions, for example, are in the neighborhood of 20%-30% slower than decrypted HTTP transmissions. Similarly, encrypting an entire document locally is costly, especially when only certain parts of the document (for example, personal user name, telephone, address, and credit card numbers in an order) actually need the security that encryption provides. Furthermore, the process of encrypting the document is usually inconvenient, at best, requiring the user isolate it as a separate file and then invoking a suitable tool for encrypting it.

As mentioned, currently, document security is an all or nothing task. There remains a need for a document security system in which a user could select only specified portions of a document for concealment, while displaying other unconcealed portions of the document.

SUMMARY OF THE INVENTION

It is an objective of the present invention to provide a method for selectively concealing portions of a document.

It is a second objective of the present invention to provide a method for concealment of selective portions of a document through encryption techniques.

It is a third objective of the present invention is to provide a method for securing the confidential contents of a document through selective concealment of the confidential contents.

It is a fourth objective of the present invention is to provide for selective decryption of encrypted sections of a document.

It is a fifth objective of the present invention to provide a method for encrypting multiple sections of a document, each section having the ability to be decrypted or viewed with different sets of keys so that different sets of users are allowed to see different subsets of the document.

The present invention encrypts one or more copies of each selected section of the document, each copy encrypted with one of a set of one or more different encryption keys, where the one or more sections of a document are selected by the user (author or creator) for concealment while other portions of the document remain displayed as created. The user would use a standard word processing editor technique to highlight (or swipe) portions of a document that the user desires to be concealed. The highlighted area would then be tagged with a surrounding attribute indicating to the word processor that highlighted area is to be concealed. Specific encryption keys would be assigned to be used to encrypt each selected section. In accordance with the present invention, one section could have copies of the section, each copy encrypted with a different key. In one example, a first paragraph of the document may have three copies, each encrypted with different encryption keys (X, Y, and Z). A second paragraph may have two copies, each encrypted with different encryption keys (Y and Z). A third paragraph may be encrypted with encryption key (Z). In this example, someone having key Z could access any paragraph in the document. Someone having encryption key Y could access the second and third paragraphs. Someone with encryption key X could only access the third paragraph. In this method, when the document is displayed if the appropriate decryption keys are offered for a section, the encrypted areas are converted back to text and displayed as they were originally written. If the decryption keys are not offered or are incorrect, the target areas are displayed as gibberish to maintain placement of objects in the surrounding parts of the document or a message or graphic is substituted indicating decryption failed. In addition, when a section is not decrypted, an alternative method of displaying that section is to show a box for entering a decryption key and a button to press to activate the decryption process.

DESCRIPTION OF THE DRAWINGS

FIG. 5a is an illustration of an encryption key used to initiate the decryption of encrypted material.

FIG. 5b is an illustration of an additional encryption key that could be used to access a section of a document already having an encryption key.

FIG. 5c is an illustration of a third encryption key used that can be used to access the same section of a document having encryption keys from FIGS. 5a and 5b.

FIG. 6 is an illustration of information used to authenticate the request for access to encrypted information.

FIG. 8a is a flow diagram of the method of the present invention in which multiple key encryption techniques are used to conceal selected portions of a document for transmission across a computing network.

FIG. 8b is a flow diagram of the method of the present invention in which decryption techniques are used to restore encrypted portions of a document following transmission of the document across a computing network.

DETAILED DESCRIPTION OF THE INVENTION

The present invention uses encryption techniques to conceal selective portions of a document. These encryption schemes transform data into a format that is readable when decrypted using predetermined decryption keys. User authentication and Data Encryption schemes provide the ability to authenticate, encrypt and decrypt certain information. In the present invention, the creator of a document can select a section of the document and have multiple encryption keys used on that document section. Anyone attempting to access that section of the document will need at least one of the encryption keys for that section. U.S. patent application Ser. No. 10/692,142 by the same inventors and to the same assignee explains much of the technology concerning the encryption of documents. Those document encryption descriptions are incorporated herein by reference.

Figure 1:
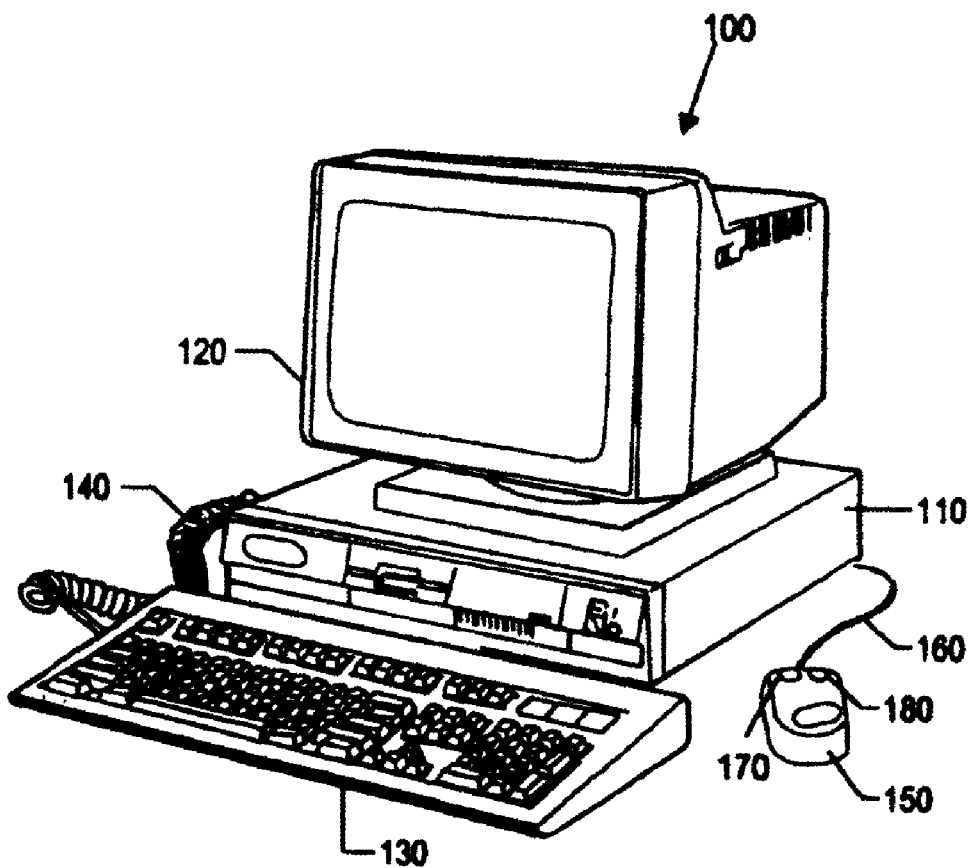
FIG. 1 depicts a pictorial representation of data processing system that can be used in the implementation of the present invention.

With reference now to FIG. 1, there is depicted a pictorial representation of computing device 100 which may be used in implementation of the present invention. As may be seen, data processing system 100 includes processor 110 that preferably includes a graphics processor, memory device and central processor (not shown). Coupled to processor 110 is video display 120 which may be implemented utilizing either a color or monochromatic monitor, in a manner well known in the art. Also coupled to processor 110 is keyboard 130. Keyboard 130 preferably comprises a standard computer keyboard, which is coupled to the processor by means of cable 140. Also coupled to processor 110 is a graphical pointing device, such as mouse 150 (other examples of pointing devices include a light pen and a roller ball). Mouse 150 is coupled to processor 110, in a manner well known in the art, via cable 160 As is shown, mouse 150 may include left button 170, and right button 180 each of which may be depressed, or "clicked", to provide command and control signals to data processing system 100 While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 100 may be implemented utilizing a personal computer.

Figure 2:
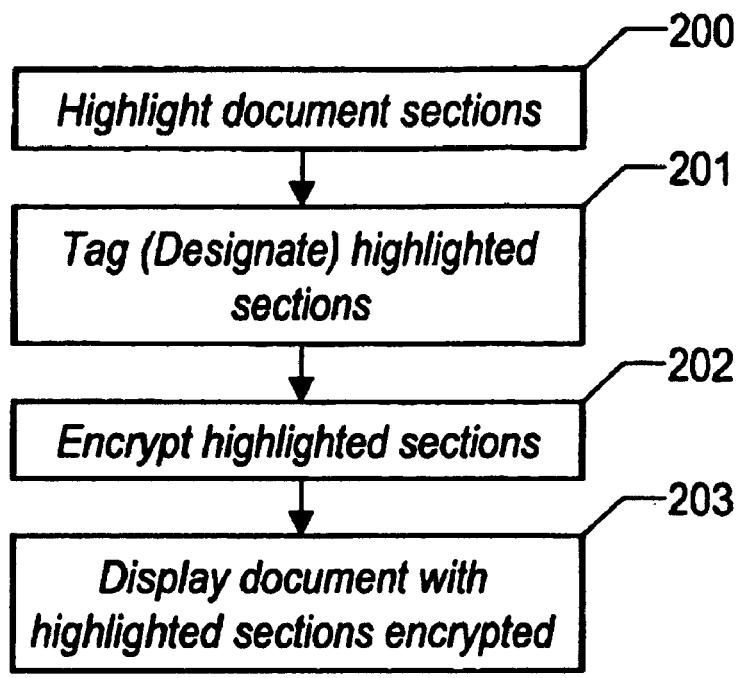
FIG. 2 is a flow diagram of the general method for implementing the concepts of the present invention.

Referring to FIG. 2, shown is a flow diagram of the general method for implementing the concepts of the present invention. During the creation of a document, the creator/user may desire to encrypt certain portions of the document for security reasons. In accordance with this invention, in step 200, the user can highlight a desired portion of the document. This process is the same as highlighting for other purposes such as to BOLD, UNDERLINE or ITALICIZE a portion of the document. In a typical highlighting process, the highlighting is accomplished by holding the mouse button down and moving the cursor, (also called "dragging" or "swiping"), over the text that the user desires to highlight. As the cursor moves over text, all text covered by the cursor is indicated on the screen. When the user releases the button, no further text is highlighted with that particular cursor movement. The next step, 201, would be to initialize the encryption process of the present invention. As with other functions, the user could click ENCRYPT icon, shown in FIG. 3, to initiate encryption process. In this encryption process, after the user has highlighted the desired text, the user will then select the encryption key or keys for the encrypted information. Alternatively, the user may "right click" with the other mouse button after highlighting a section, which would bring up a pop-up menu containing an "ENCRYPT" option along with the typical right click menu items such as CUT, PASTE, etc. As mentioned the user can click the ENCRYPT icon or choose ENCRYPT from a pop-up menu. At this point, a new pop-up can appear to enable the user to choose one or more encryption keys from a preset list or to add in a new key that will be added to the list for use in encrypting sections. Another key selection method could be for the word processor or other tool being used to prompt the user for the key or keys that will be used to encrypt the highlighted portion of the document. One additional option could be to specify any of several keys to be used by key set name rather than the actual key values (presumably to target different sets of ultimate readers) so that when a portion of the document is highlighted, a reader need only choose one of the provided sets of keys instead of typing the actual key values each time. When there is a preset list of keys, one would not show the actual key, but rather a symbolic name for the keys or sets of keys. This approach provides some security against person looking over the shoulder of the reader and observing the key. In this method, the reader would enter a name for the key initially and this name would be displayed for each pre-entered key. Still another approach would be to always show the last 10 or so keys entered (by name) similar to one opens a new document, where the user has the option of choosing one of several recently edited documents.

After receiving the encryption keys during this encryption process, step 202, copies of the highlighted portion of the document would be encrypted each using a different selected key using the encryption routines available for that system. As a result of the encryption process, the plaintext version of the section would be removed and one or more encrypted versions of the section would be saved, each having been encrypted with different keys. Any of the selected keys used during encryption would be able to decrypt the encrypted section. Following the encryption process, in step 203, the document is displayed containing encrypted portions shown as gibberish, blanked out text or other format or indication. In one alternative approach, the encrypted section may not be shown as gibberish to the author but rather optionally modified in some other way to indicate that the section is encrypted. Even though the actual text may not be shown, information can be kept, giving the linear length of the text so that the document formatting can be essentially retained even when the text is obscured. For example the encrypted section might have fine diagonal red lines drawn under the blanked out text. Also, when a reader decrypts a section, it might not turn into simple black on white text, but again may be displayed in a unique manner to show that it was a section that was encrypted and warn the reader that this section should be treated carefully. A situation where this precaution may be needed is when someone is hovering over the reader's shoulder trying to also read the screen.

Figure 3:
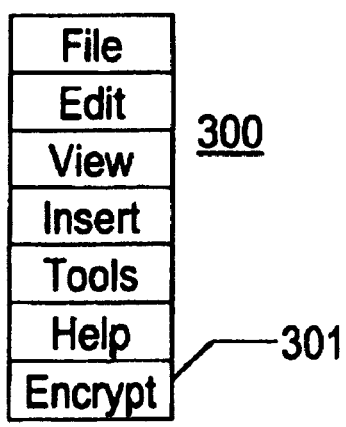
FIG. 3 is a pop-up menu of a word processor program containing the ENCRYPT icon of the present invention.

Referring to FIG. 3, shown is an illustration of a pop-up menu 300 containing icons for various word processing functions. In this menu is an ENCRYPT icon 301. Instead of including the ENCRYPTION icon 301 in a pop-up menu, another option is to include the encryption icon as one of the general function icons continually displayed during an editing session similar to the BOLD and UNDERLINE icons. During an editing session, if a user may want to encrypt the sections of a document, the user can highlight that paragraph and click the ENCRYPT icon 301. The encryption process will then encrypt the highlighted contents according the present invention.

Figure 4A:
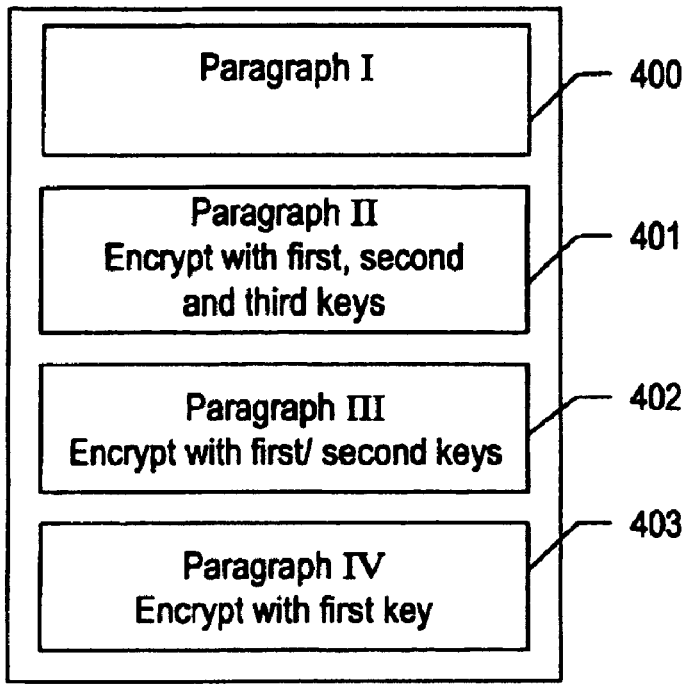
FIG. 4a is an illustration of a document containing multiple sections that can be selected for separate and unique encryption, wherein a selected section can use multiple encryption keys.

FIG. 4a is an illustration of a document containing multiple sections that can be selected for separate and unique encryption. As shown, this document contains four paragraphs. In this example, a user can choose to designate three of the paragraphs for encryption. The user can choose to leave paragraph 400 in the initially created form for anyone to read. However, a user may only want certain people to see certain information. With the features of the present invention, a user can create one document with some general information for everyone and some specific information for different people. Paragraphs 401, 402 and 403 could be designated for different groups of viewers. As a result, each paragraph could be encrypted with the same or with unique encryption keys. For example, paragraph 401 may have been encrypted using three encryption keys (X, Y, and Z). Paragraph 402 may have been encrypted using two encryption keys (Y and Z). Paragraph 403 may have been encrypted using one encryption key (Z). In this example, someone having key Z could access any paragraph in the document. Someone having encryption key Y could access paragraphs 401 and 402. Someone with encryption key X could only access paragraph 401. In one embodiment as depicted in FIG. 4a, paragraphs 400, 401, 402, and 403 are each a distinct section in the document such that no paragraph of paragraphs 400, 401, 402, and 403 is embedded in any other paragraph of paragraphs 400, 401, 402, and 403.

Figure 4B:
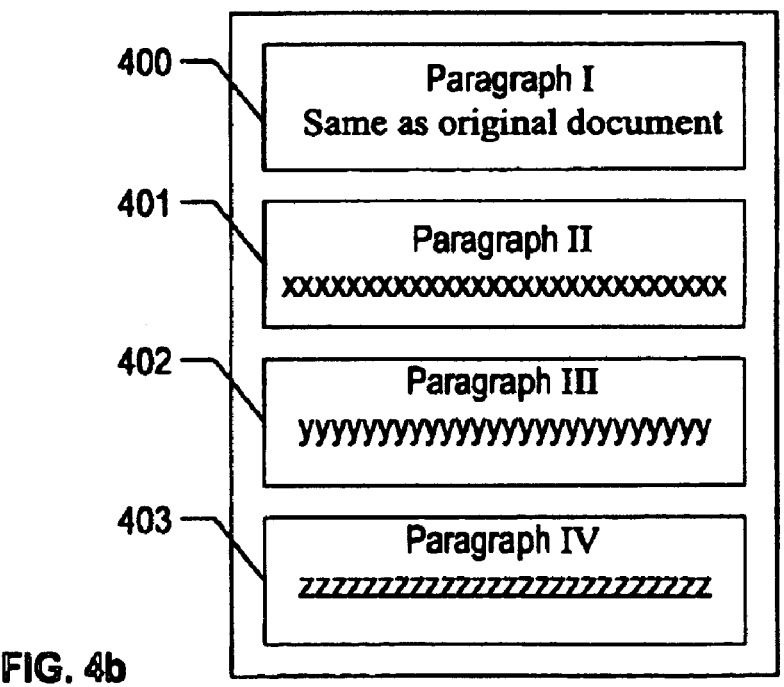
FIG. 4b is an illustration of the document with selected areas with each area having a unique and separate encryption from the other encrypted areas of the document.

FIG. 4b is an illustration of the document having selected areas with each area having a unique and separate encryption from the other encrypted areas of the document. As shown, paragraph 400 did not change from the original paragraph. Paragraphs 401, 402 and 403 were each encrypted and the resulting information appears as random letters in the document. The appropriate people would know the correct keys to apply to decrypt the information for which they have authority to read.

FIGS. 5a, 5b, and 5c 6 show examples of encryption keys 500, 501 and 502. These keys contain 15 alphanumeric bytes. It should be noted that a 15-byte key is just one example of a key size that can be used in the implementation of the present invention. A user seeking access to an encrypted section of the document would need to supply an appropriate key when trying to gain access to the information in an encrypted section. As previously described, one key could be for all encrypted sections of a document or for a specific segment of the document. FIG. 6 shows an embodiment, wherein the person seeking to gain access must supply along with an appropriate key 600, their name 610, the employee number 620 and the section of the document 630 for which the requester seeks access. The authentication scheme may require only the encryption key and optionally, one of the other two pieces of information.

Figure 7:
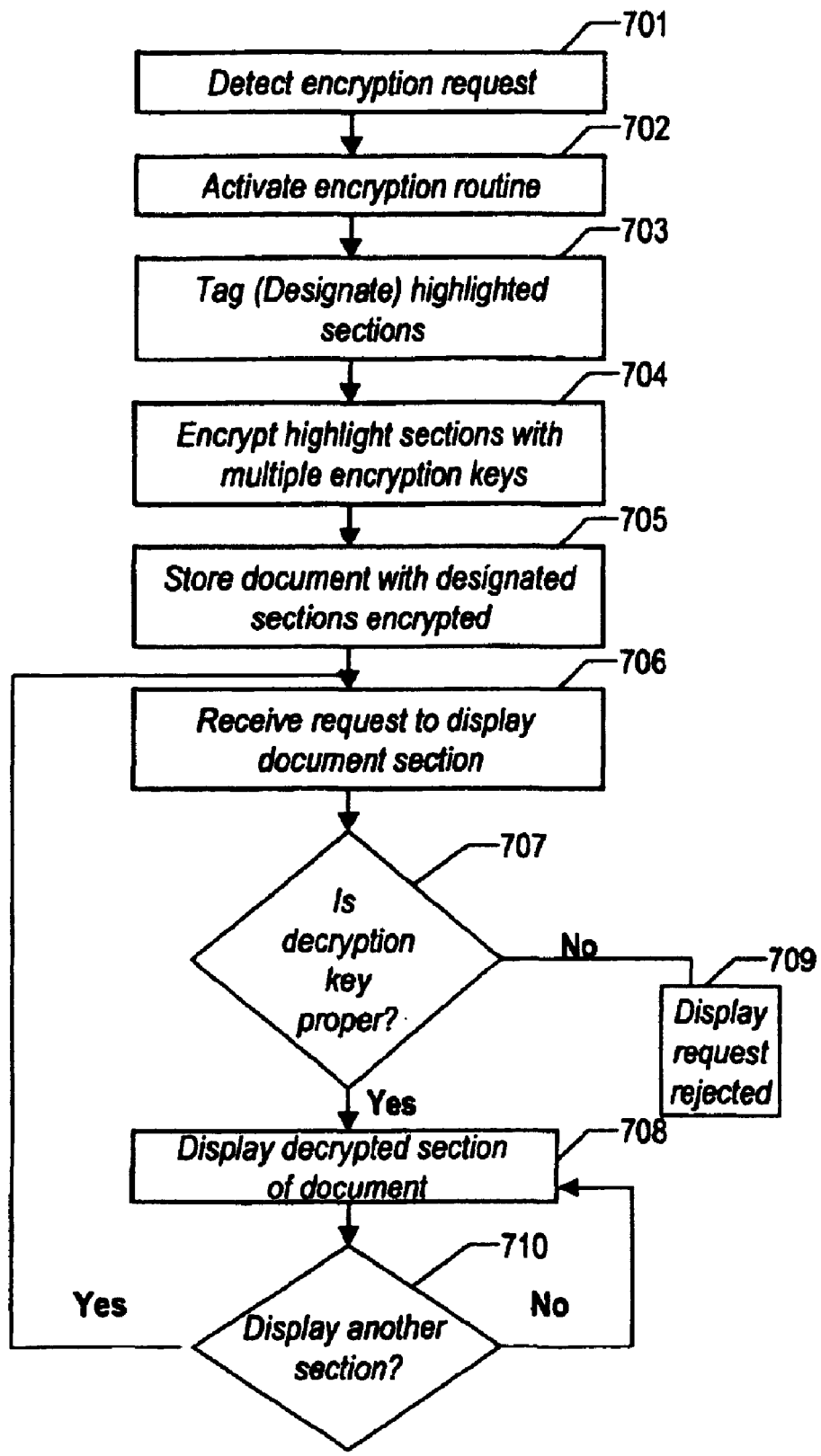
FIG. 7 is a flow diagram of the method of the present invention in which the encryption function is accomplished using multiple encryption keys for selected sections of a document.

Referring to FIG. 7, step 701 of the method of the present invention detects a command to encrypt a portion of a document. The ideal application for the present invention is when the desire is to encrypt multiple sections of a document. At this point, the section of the document to be encrypted is highlighted on the screen and viewed by the user. In step 702, the user can click an encryption icon 25 or an encryption menu item. Clicking the encryption icon will activate the encryption routine. Within this routine, step 703 will tag the sections and designate them for encryption. This tagging may take a form suitable for the document format used. For example, if the document were stored in an XML type of format, the section might be enclosed with markup tags such as "<encryptedsection>" and "</encryptedsection>. The enclosed plain text data would be replaced with the encrypted data created in step 704. Alternatively, the encrypted data might be stored at the end of the file or other location by convention, with the tagged area pointing to this data. Step 704 will perform the encryption of the highlighted information using encryption techniques such as the previously described techniques. In this step, copies of each section will be each encrypted with a different one of the multiple encryption keys as determined by the document creator. Once the document creator selects the encryption keys for each section, only those encryption keys will be able to access that section of the document.

At the completion of the encryption process, the user can continue to edit the document and encrypt other portions of the document as the user desires. In step 705, the document will be stored in a file on some storage media or transmitted over some communication means to some other location for storage or viewing in accordance with the commands of the user.

When there is an attempt to access an encrypted portion of the document, step 45 detects the attempt to access that encrypted portion. In step 707, there is a determination of whether the user attempting the access has proper authority to view that portion of the document. In this determination, the requestor must provide a correct key or multiple keys to activate a decryption of the encrypted contents that the requestor wants to access. If the requester has the correct key, the decryption of the encrypted contents occurs. The decryption process attempts to decrypt the section using each of the provided decryption keys and if one is successful, the method moves to step 708, which displays the contents of the encrypted section as part of the document. If in step 707, there is a determination that the one requesting access does not have authority to view that section of the document (none of the provided decryption keys successfully decrypted the section), the method moves to step 709 where the access attempt is rejected and only the unencrypted portions of the document are displayed to the requester. After the completion of step 708, if there are other sections of the document for which one desires access, step 710 will enable the one requesting access to select another section of the document to decrypt. The process would return to stop 707 for the next section. Alternatively, step 710 may be configured to automatically attempt to decrypt all of the encrypted sections in the document using the keys provided by the reader.

FIGS. 8*a* and 8*b* illustrate an implementation of the present invention for transmission of a document with encrypted contents across a computing network. In FIG. 8*a*, shown is a flow diagram of the method of the present invention in which encryption techniques are used to encrypted portions of a document for transmission across a computing network. In this method, steps 801, 802, 803, and 804 are the same as steps 701, 702, 703, and 704 in FIG. 7 respectively. In step 805, the document is displayed with highlighted sections encrypted. In step 806, the document is stored with designated sections encrypted. In step 807, there is a transmission over a computing network of the document containing sections that are encrypted using encryption techniques.

In FIG. 8*b*, a transmitted message is received at a destination location in step 808. When there is an attempt to open the document, step 809 detects a request to access an encrypted section of the document. In step 810, there is a determination of whether the requester has the proper decryption keys for that encrypted portion of the document. Step 811 will perform a decryption of the encrypted contents. If the decryption process is successful, the method moves to step 812, which displays the contents of the previously encrypted portion of the document. If in step 810, there is a determination that the requester does not have the proper decryption keys, the method moves to step 813 where the access requested is rejected. Step 814 will give the requester an opportunity to decrypt other sections of the document as previously described.

As the document is displayed, as any encrypted section is encountered, the displaying software would try to decrypt the encrypted section with each of the previously entered encryption keys until one successfully decrypts the section. If none of them succeeds in decrypting the section, the user would be prompted to add yet another decryption key to his list (that would presumably work for this section.) The way the system could tell whether a decryption was successful or not would be to include a known string to every section to be encrypted. Then, on decryption, if the added known string does not appear in the decrypted text, then the decryption would be considered a failure, which would then cause the system to try a different key from the list entered by the user. This known string would be removed from the text and thereby not be displayed. The encryption keys should be of sufficient length and methods used for encryption be sufficiently strong to avoid any possibility of using these multiply encrypted copies to discover the encoded text or any of the keys by an outside party. Also, if one party knows the text because he has one of the keys, the techniques should not make it possible to permit that user to discover any of the other keys. One way to help prevent this is to have a different random string appended to each text copy before it is encrypted. This random string is discarded after decryption. Alternatively, any of the encrypted sections may contain non-text data such as image data. This data can be encrypted and decrypted with the same methods as plain text and as such should not present a limitation to the applicability of this invention.

Figure 9A:
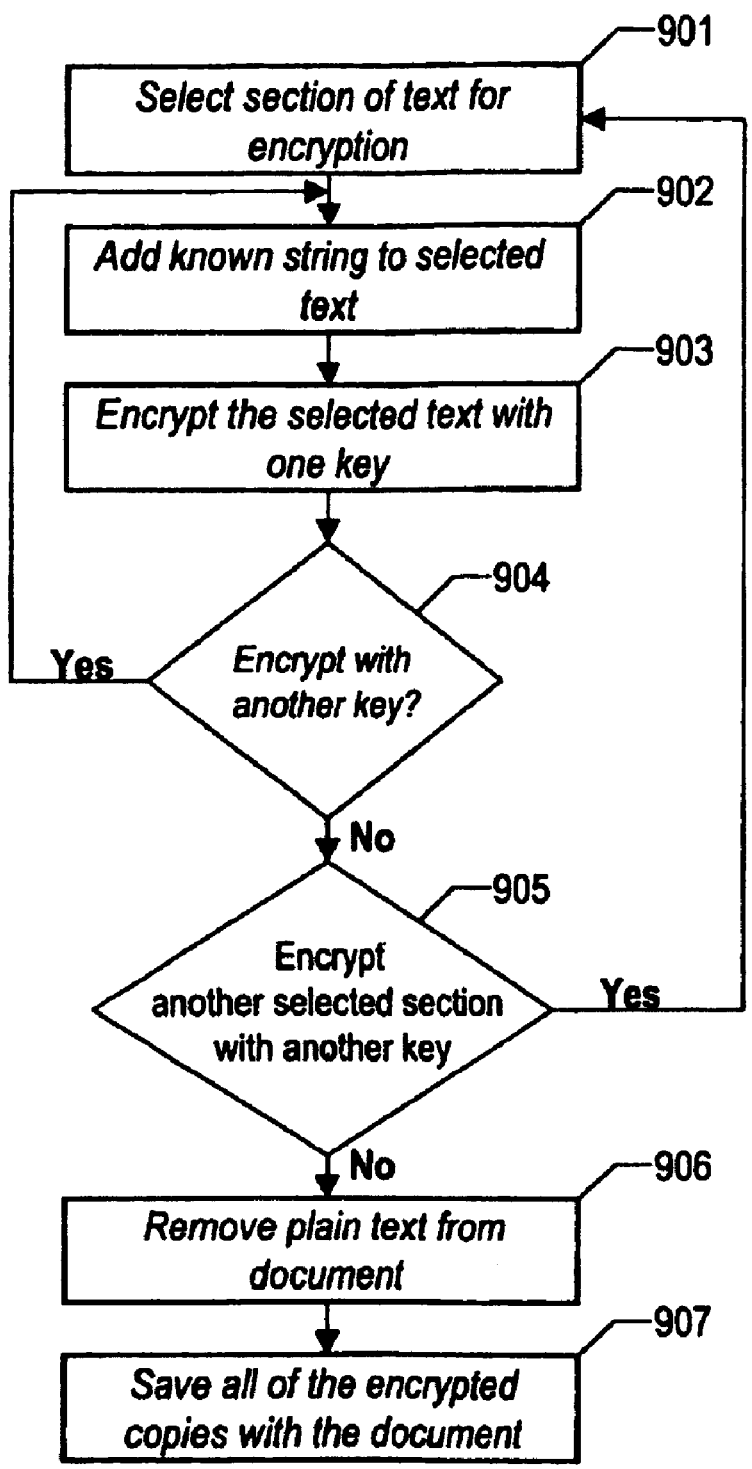
FIG. 9a is a flow diagram of an alternate method of the present invention in which known character strings are attached to an encrypted document for use during the decryption process to detect successful decryption.
Figure 9B:
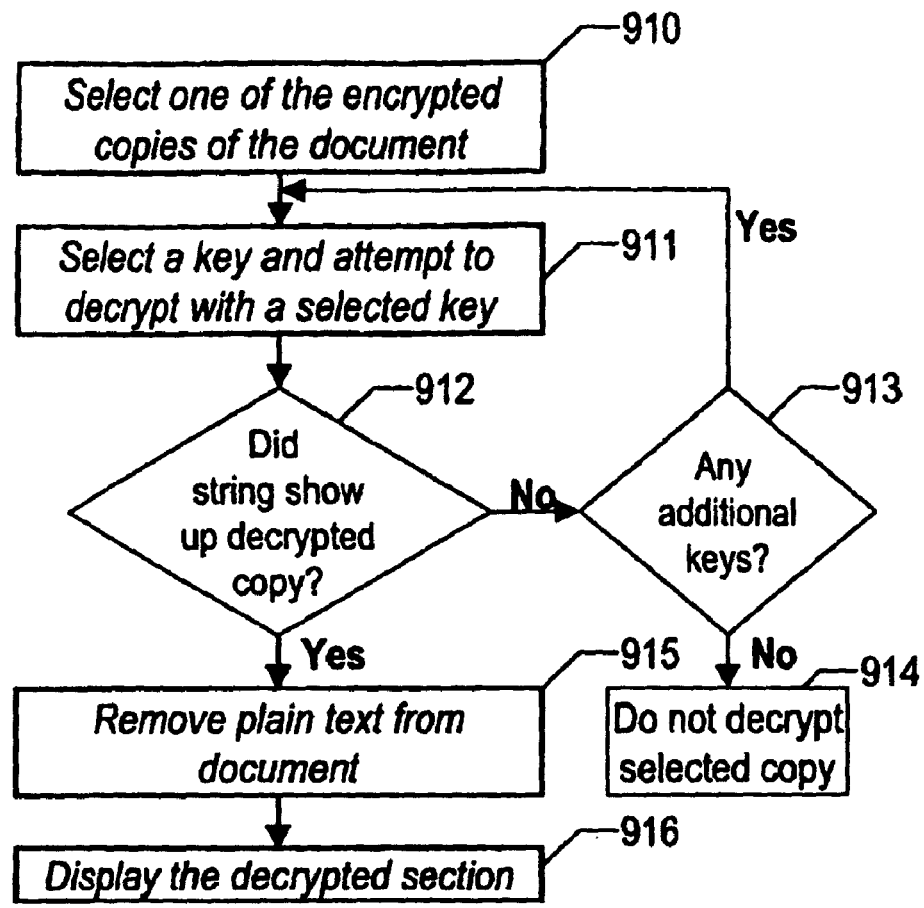
FIG. 9b is a flow diagram of the decryption techniques of the present invention using attached character strings to detect a successful decryption of a document.

FIGS. 9*a* and 9*b* illustrate the encryption techniques involve using known character strings to detect successful decryption. As shown in FIG. 9*a*, in step 901, the user or document creator can select a section of a document for encryption. Once the document section is selected, step 902 can add a string of known characters to the document text. This known character string can be placed at a designated location in the document, such as the beginning or end of the section. The known text will be used upon decryption to test if the decryption was successful. Optionally, an additional string of random text may be added to the copy of the section to make it more difficult to crack the encryption scheme. Any such random text would be discarded upon decryption. The next step, 903, encrypts the document containing the known character string. At this point, in step 904, if the user specified more than one key, another clear text copy of the section is taken and this new copy is processed with the additional key as indicated starting with step 902. As previously described, this entire document can have multiple sections that are encrypted with various keys for selected viewers. Someone may be able to view one section, while another person may be able three sections. Each section could have been encrypted using a different encryption key.

If the user specified more than one encryption key for the selected section, the process returns to step 902. The system would then encrypt another copy of the plain text section with the next key. Once the system has used all of the keys specified for the section to encrypt copies of that section, then the user has the option to select another section of the document for encryption under step 905. If the user desires to encrypt another section of the document, the process returns to step 901. If the user has completed the selection of document sections, step 906 removes all of the plain text versions of the encrypted sections from the document. Step 907 saves a copy of each encrypted section of the document, either in-line where the original plain text was positioned or at some other point in the file according to a convention established for the document type format. A copy of each encrypted section is saved for each key used in the encryption process.

Referring to FIG. 9*b*, shown is a flow diagram of the steps involved in the decryption of the document using the known character string to verify the success of the decryption. In step 910, one of the encrypted sections of the document is selected for decryption. For purposes of this description, section A is the section for which decryption is desired. Step 911 will select a key from the list of supplied keys to use in an attempt to decrypt this section A. Step 912 determines whether the decryption process was successful. Attempting to read the known character string does this determination. If the string appears in the decrypted copy, then the key was correct and the decryption was successful. If the string does not appear in the decrypted copy, then the decryption was not successful. At this point, step 913 determines whether the user has additional keys to use in an attempt to decrypt that section A of the document. If the user has additional keys, the process returns to step 911 and repeats steps 911 and 912. If in step 913, the user does not have additional keys and the decryption attempt was not successful, then that section of the document will not be decrypted for that user in step 914. Referring to step 912, if the decryption was successful, the process moves to step 915 where both the known character string and the random character string (if one was added) are removed from the text and the text is displayed for the user in step 916.

Furthermore, if a section of the document is supposed to be decryptable with more than one key, then multiple copies of that section would be included in the document file, each copy encrypted with a different key. There would of course be some tag information that indicated that the particular section is duplicated and encrypted with different keys. This would be used to have some parts of the document encrypted for department A viewing, for example, and other non-disjoint parts for viewing by department B. Additionally, tag information may have been added to indicate the text space consumed by the decrypted plain text. This would have been used to more properly format an unencrypted portion so that surrounding information is not displaced from its original page or position in the document.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

The invention claimed is:

1. A method for selective encryption within a document, said method comprising:
   detecting a first section of a document, said first section having been selected and marked for encryption;
   detecting a second section of the document, said second section having been selected and marked for encryption;
   a processor of a data processing system encrypting the first section with one encryption key;
   said processor encrypting the second section with two different encryption keys,
      wherein the first section is not embedded in any other section of the document that has been encrypted and/or marked for encryption and no other section of the document that has been encrypted and/or marked for encryption is embedded in the first section, and
      wherein the second section is not embedded in any other section of the document that has been encrypted and/or marked for encryption and no other section of the document that has been encrypted and/or marked for encryption is embedded in the second section,
   said processor receiving an access request to access the encrypted first section of the document;
   responsive to said receiving the access request, said processor determining that a received decryption key for the encrypted first section of the document is proper for the encrypted first section, by attempting to decrypt the encrypted first section with the received decryption key by determining that a defined character string is in the encrypted first section;
   responsive to said determining that the received decryption key is proper for the encrypted first section of the document, said processor retrieving and decrypting the encrypted first section of the document for which the access request was made to generate a first decrypted section of the document corresponding to the encrypted first section; and
   said processor displaying the first decrypted section of the document.

2. The method of claim 1, said method further comprising:
   after said encrypting the first section and said encrypting the second section, displaying the document with the encrypted first section and the encrypted second section being displayed in a random unintelligible format.

3. The method of claim 2, said method further comprising:
   after said displaying, transmitting the document across a computing network to an identified destination.

4. The method of claim 1, wherein the one encryption key and the two encryption keys comprise a same encryption key.

5. The method of claim 1, said method further comprising:
   before said encrypting the first section, adding the defined character string to the first section.

6. The method of claim 1, said method further comprising:
   detecting a third section of a document, said first section having been selected and marked for encryption; and
   said processor encrypting the third section with three different encryption keys, wherein the third section is not embedded in any other section of the document that has been encrypted and/or marked for encryption.

7. The method of claim 1, said method further comprising:
   said processor ascertaining that an employee has satisfied requirements of: providing said one encryption key, providing a name of the employee, providing an employee number of the employee, and providing an identification of the first section; and
   in response to said ascertaining, said processor enabling the employee to access the first section of the document.

8. The method of claim 1, said first section consisting of text, said method further comprising:
   after said encrypting the first section and said encrypting the second section, displaying the document with the encrypted first section being displayed with the text being blanked out and with diagonal red lines drawn under the blanked out text.

9. A computer program product, comprising a computer readable storage device containing instructions that, upon being executed by a processor of a data processing system, implement a method for selective encryption within a document, said method comprising:
   detecting a first section of a document, said first section having been selected and marked for encryption;
   detecting a second section of the document, said second section having been selected and marked for encryption;
   encrypting the first section with one encryption key;
   encrypting the second section with two different encryption keys,
      wherein the first section is not embedded in any other section of the document that has been encrypted and/or marked for encryption and no other section of the document that has been encrypted and/or marked for encryption is embedded in the first section, and
      wherein the second section is not embedded in any other section of the document that has been encrypted and/or marked for encryption and no other section of the document that has been encrypted and/or marked for encryption is embedded in the second section, receiving an access request to access the encrypted first section of the document;

responsive to said receiving the access request, determining that a received decryption key for the encrypted first section of the document is proper for the encrypted first section, by attempting to decrypt the encrypted first section with the received decryption key by determining that a defined character string is in the encrypted first section;

responsive to said determining that the received decryption key is proper for the encrypted first section of the document, retrieving and decrypting the encrypted first section of the document for which the access request was made to generate a first decrypted section of the document corresponding to the encrypted first section; and displaying the first decrypted section of the document.

10. The computer program product of claim 9, said method further comprising:

after said encrypting the first section and said encrypting the second section, displaying the document with the encrypted first section and the encrypted second section being displayed in a random unintelligible format.

11. The computer program product of claim 10, said method further comprising:

after said displaying, transmitting the document across a computing network to an identified destination.

12. The computer program product of claim 9, wherein the one encryption key and the two encryption keys comprise a same encryption key.

13. The computer program product of claim 9, said method further comprising:

before said encrypting the first section, adding the defined character string to the first section.

14. The computer program product of claim 9, said method further comprising:

detecting a third section of a document, said first section having been selected and marked for encryption; and encrypting the third section with three different encryption keys, wherein the third section is not embedded in any other section of the document that has been encrypted and/or marked for encryption.

15. The computer program product of claim 9, said method further comprising:

ascertaining that an employee has satisfied requirements of: providing said one encryption key, providing a name of the employee, providing an employee number of the employee, and providing an identification of the first section; and in response to said ascertaining, enabling the employee to access the first section of the document.

16. The computer program product of claim 9, said first section consisting of text, said method further comprising:

after said encrypting the first section and said encrypting the second section, displaying the document with the encrypted first section being displayed with the text being blanked out and with diagonal red lines drawn under the blanked out text.

17. A computer program product, comprising a computer readable storage device containing instructions that, upon being executed by a processor of a data processing system, implement a method for selective encryption within a document, said method comprising:

detecting a document encryption request;

activating a document encryption routine;

accessing a proposed document for encryption and tagging one or more sections of the proposed document as designated for encryption;

encrypting the tagged sections with multiple encryption keys;

extracting the plain text version of each encrypted sections from the document;

marking locations in the document where the extracted sections were located;

storing a copy of each encrypted section of the document for each key used in the encryption process, extracted sections from the document in an appendix attached to the document;

receiving a request to access an encrypted section of the document;

determining whether a received decryption key for the encrypted section of the document for which the access request was made is proper for that encrypted section, by selecting one of the encrypted copies of the document, selecting a key and attempting to decrypt the selected encrypted copies with the selected key by determining if a defined character string is in the selected copy of the encrypted section;

when the determination is that the received decryption key is proper, retrieving and decrypting the section of the document for which the access request was made; and displaying the decrypted section of the document.

\* \* \* \* \*